United States Patent
Dinh (10) Patent No.: US 8,309,849 B2
(45) Date of Patent: Nov. 13, 2012

(54) ATTACHABLE SUPPORTING SPACER FOR ELECTRICAL BOXES

(75) Inventor: Cong Thanh Dinh, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 292 days.

(21) Appl. No.: 12/841,315

(22) Filed: Jul. 22, 2010

(65) Prior Publication Data

US 2011/0024153 A1 Feb. 3, 2011

Related U.S. Application Data

(60) Provisional application No. 61/229,850, filed on Jul. 30, 2009.

(51) Int. Cl.
*H05K 5/00* (2006.01)
(52) U.S. Cl. .......... 174/58; 174/480; 174/481; 248/343; 220/3.9; 52/60
(58) Field of Classification Search ..... 174/58, 174/480, 481; 248/906, 343; 52/60; 220/3.9, 220/3.92
See application file for complete search history.

(56) References Cited

U.S. PATENT DOCUMENTS

| | | |
|---|---|---|
| 1,774,934 A | 9/1930 | Mangin |
| 3,767,151 A | 10/1973 | Seal et al. |
| 4,447,030 A | 5/1984 | Nattel |
| 4,688,693 A | 8/1987 | Medlin, Jr. |
| 4,964,525 A | 10/1990 | Coffey et al. |
| 5,025,944 A * | 6/1991 | Rodick ............ 220/3.9 |
| 5,031,789 A | 7/1991 | Dauberger |
| 6,389,658 B1 | 5/2002 | Pfaller et al. |
| 6,956,172 B2 | 10/2005 | Dinh |
| 7,735,795 B2 * | 6/2010 | Wronski ............ 248/343 |
| 7,939,755 B1 * | 5/2011 | Sapio ............... 174/58 |
| 8,063,302 B1 * | 11/2011 | Gretz ............... 174/58 |

* cited by examiner

*Primary Examiner* — Dhirubhai R Patel
(74) *Attorney, Agent, or Firm* — Snyder, Clark, Lesch & Chung, LLP (57) ABSTRACT

An integrally formed spacer may include an upper body having a flat surface. The upper body may include a fastening tongue perpendicular to the flat surface and dimensioned to fit into a first fastening hole in a wall of an electrical box. In addition, the integrally formed spacer may include a lower body with at least one leg having a notch to receive the wall of the electrical box via a second fastening hole in the wall. Further, the integrally formed spacer may include a neck portion having two ends in a lengthwise direction of the integrally formed spacer, one end of the neck portion connected to the upper body and another end connected to the lower body. When the at least one leg is in the second fastening hole and the lower body is held flat against an outside surface of the wall of the electrical box, the fastening tongue is in the first fastening hole and bending the integrally formed spacer to set the upper body perpendicular to the lower body fastens the integrally formed spacer to the wall of the electrical box.

18 Claims, 9 Drawing Sheets

ATTACHABLE SUPPORTING SPACER FOR ELECTRICAL BOXES

RELATED APPLICATION

This application claims priority under 35 U.S.C. §119 based on U.S. Provisional Patent Application No. 61/229,850 filed Jul. 30, 2009, the disclosure of which is incorporated by reference herein in its entirety.

BACKGROUND INFORMATION

Electrical outlet boxes are often mounted in walls prior to completion of the wall structure. For example, an electrical outlet box may be mounted on a wall stud prior to drywall installation.

DETAILED DESCRIPTION OF PREFERRED EMBODIMENTS

The following detailed description refers to the accompanying drawings. The same reference numbers in different drawings may identify the same or similar elements.

As described herein, a supporting spacer may be attached conveniently to an electrical box without the use of any tools. The main function of the supporting spacer is to prevent the space between the electrical box and a wall from collapsing when a force is applied to the box, such as during receptacle or drywall installation.

Figure 1:
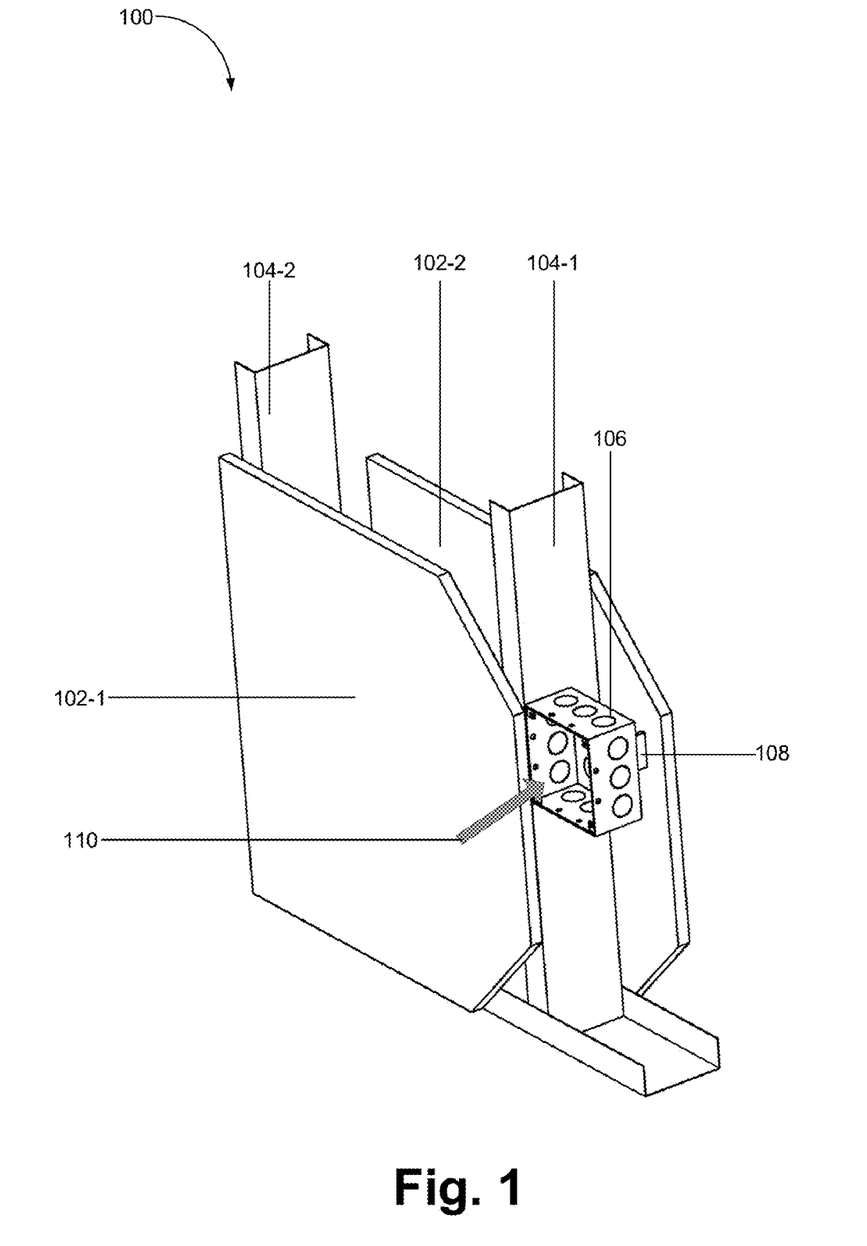
FIG. 1 illustrates an exemplary wall electrical assembly in which a supporting spacer may be used.

FIG. 1 illustrates an exemplary wall electrical assembly 100 in which a supporting spacer may be used. As shown, wall electrical assembly 100 may include drywall elements 102-1 and 102-2, wall studs 104-1 and 104-2, an electrical outlet box 106, and a supporting spacer 108. Depending on the implementation, wall electrical assembly 100 may include fewer, additional, or different components than those illustrated in FIG. 1 (e.g., a wooden stud). In addition, although electrical box can be any box associated with electrical functions (e.g., a switch box, a gang box, etc.), for the purpose of simplicity and ease in understanding, the electrical box is described in terms of electrical outlet box.

Drywall elements 102-1 and 102-2 may provide partitioning of space for occupancy of a house or building. Wall studs 104-1 and 104-2 may include vertical members of a frame to which drywall elements 102-1 and 102-2 are affixed. Electrical outlet box 106 may provide an enclosure for electrical wiring. As shown, electrical outlet box 106 is attached to wall stud 104-2. Supporting spacer 108 may extend from electrical outlet box 106 to the inner surface of drywall element 102-2. Being substantially rigid, supporting spacer 108 may prevent electrical outlet box 106 from moving toward drywall element 102-2 when a force is (e.g., an accidental push) is applied to electrical outlet box 106 in the direction of arrow 110 in FIG. 1. This may also prevent box 106 from becoming detached from wall stud 106-2, warped, or damaged.

Figure 2A:
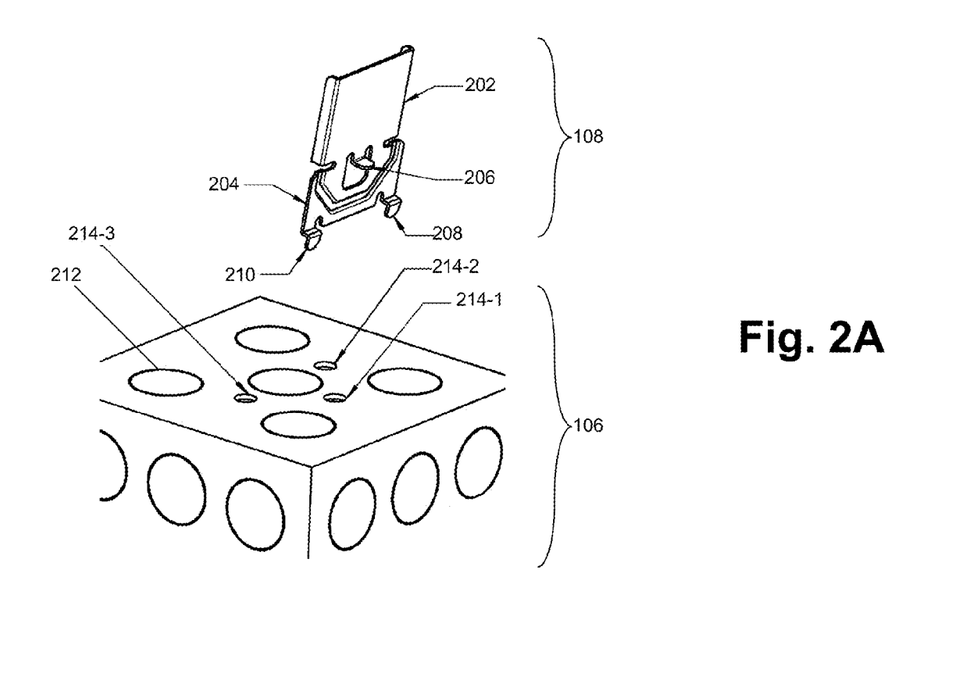
FIGS. 2A through 2D illustrate attaching the supporting spacer of FIG. 1 to an electrical outlet box.

FIGS. 2A through 2D illustrate attaching supporting spacer 108 to electrical outlet box 106. As shown in FIG. 2A, supporting spacer 108 may include an upper body 202 and a lower body 204. Upper body 202 may include a fastening tongue 206, and lower body may include legs 208 and 210. Supporting spacer 108 will be described below in greater detail with reference to FIGS. 3A-3E. Electrical outlet box 106 may include a back panel 212 in which fastening holes 214-1, 214-2, and 214-3 are provided.

Figure 2B:
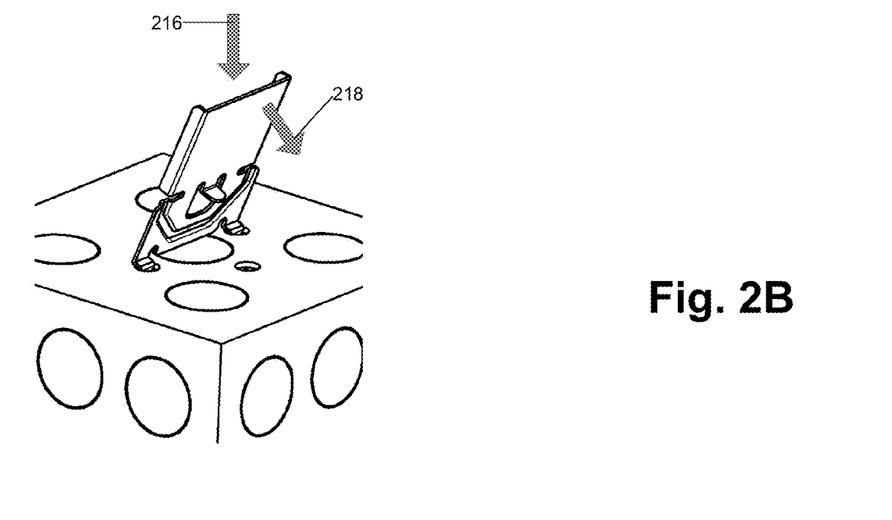

To attach supporting spacer 108 to back panel 212, legs 208 and 210 of supporting spacer 108 may be inserted into fastening holes 214-2 and 214-3, respectively, as illustrated in FIG. 2B, by lowering supporting spacer 108 in the direction of arrow 216. To insert fastening tongue 206 into fastening hole 214-1, upper body 202 may lowered in the direction of arrow 218 without disengaging legs 208 and 210 from fastening holes 214-1 and 214-2. In this manner, as shown in FIG. 2C, supporting spacer 108 may be placed flat against back panel 212.

Figure 2C:
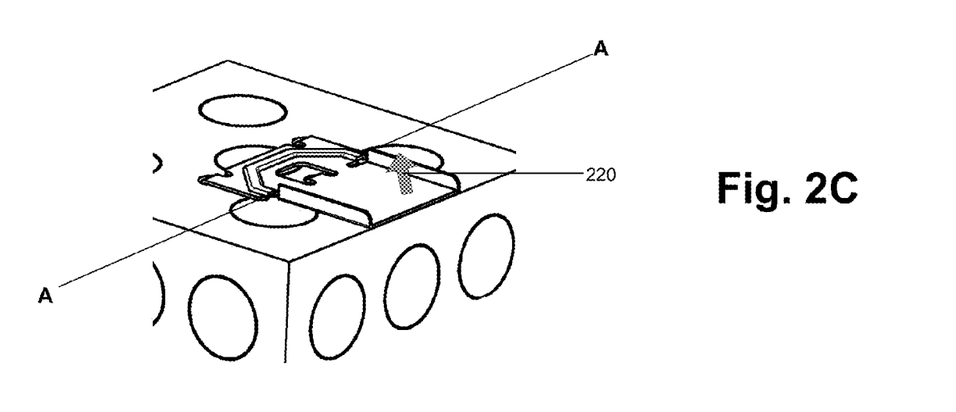

Once supporting spacer 108 is placed on back panel 212 as shown in FIG. 2C, supporting spacer 108 may be fastened to electrical outlet box 106 by raising or pivoting upper body 202 of supporting spacer 108 about a line AA (see FIG. 2C) in the direction of arrow 220. When upper body 202 is being raised, fastening tongue 206 (which is not visible in FIG. 2C or 2D), may rotate about line AA along with upper body 202.

Figure 2D:
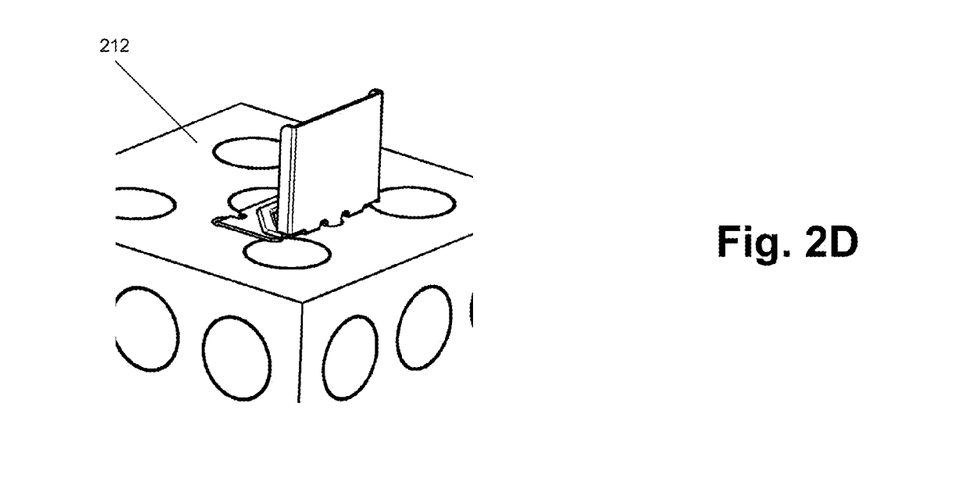

FIG. 2D shows the result of raising upper body 202 of supporting spacer 108. As shown, supporting spacer 108 is bent such that upper body 202 is perpendicular to back panel 212. Moreover, in this position, fastening tongue 206 is positioned underneath and hugs the bottom surface of back panel 212, affixing supporting spacer 108 to back panel 212 of electrical outlet box 106.

Figure 3A:
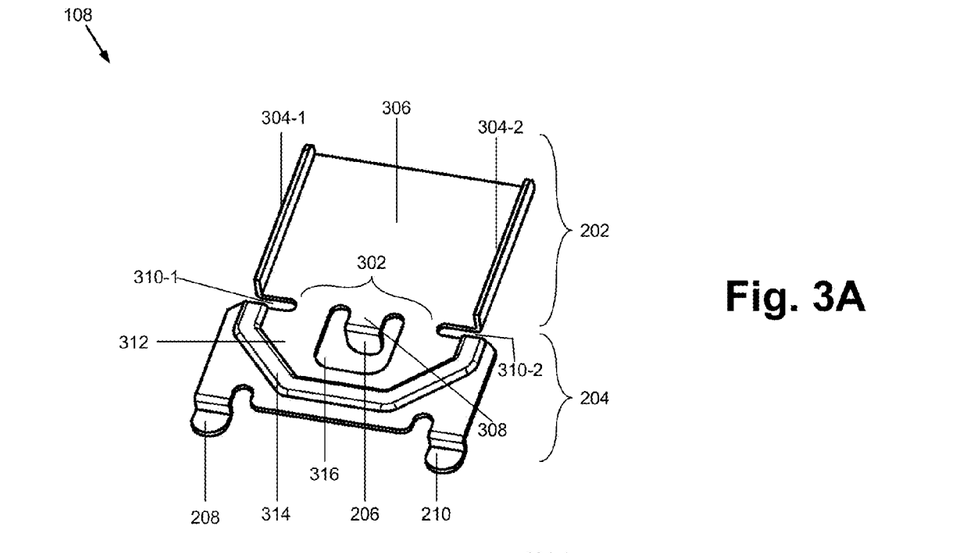
FIGS. 3A and 3B are top and bottom perspective views of the supporting spacer of FIG. 1.
Figure 3B:
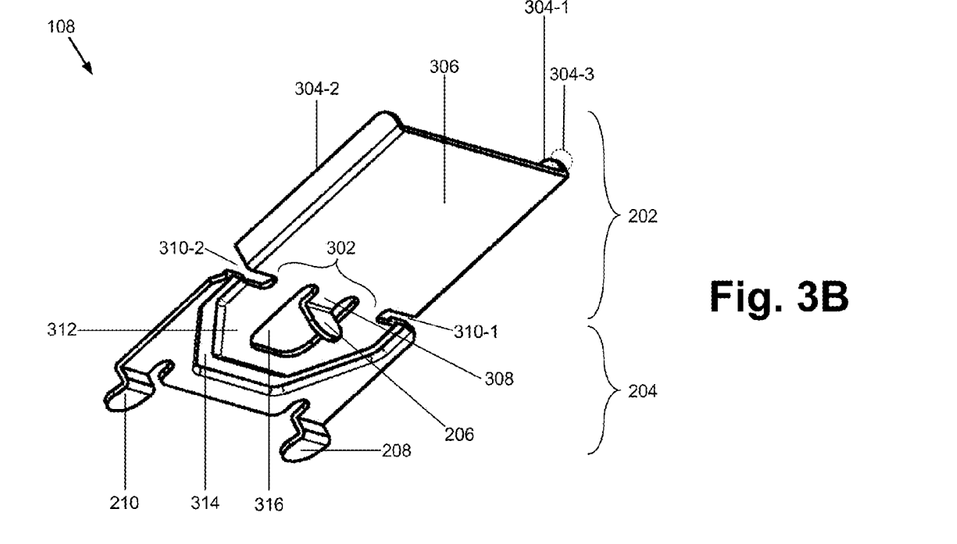
Figure 3C:
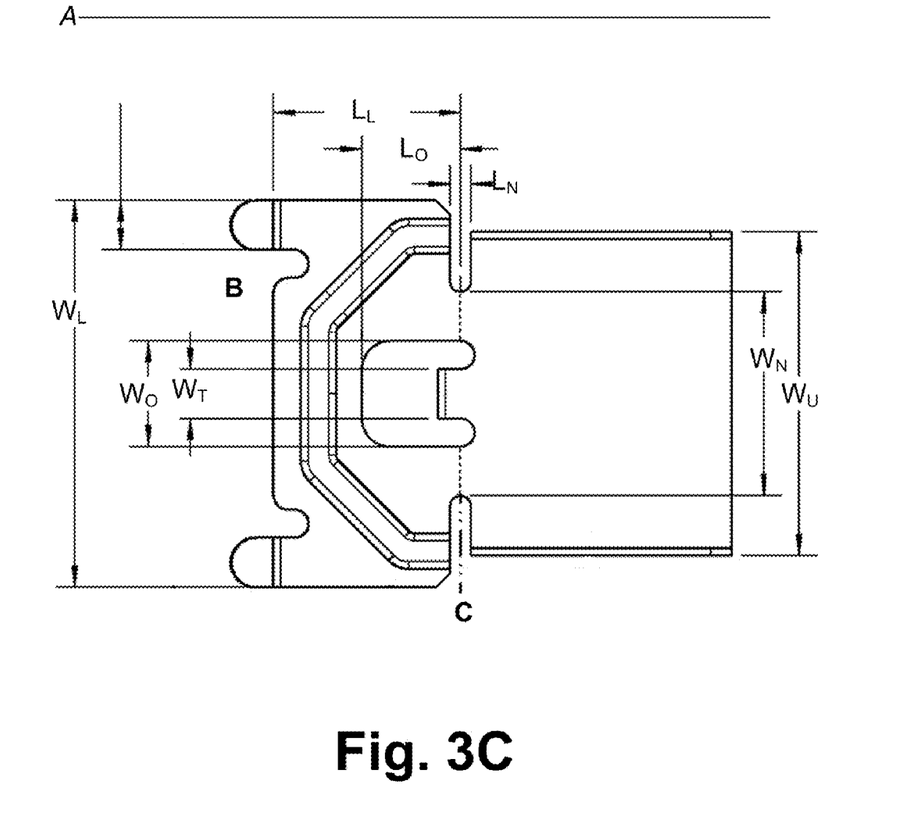
FIGS. 3C and 3D are top and side views of the supporting spacer of FIG. 1.
Figure 3D:
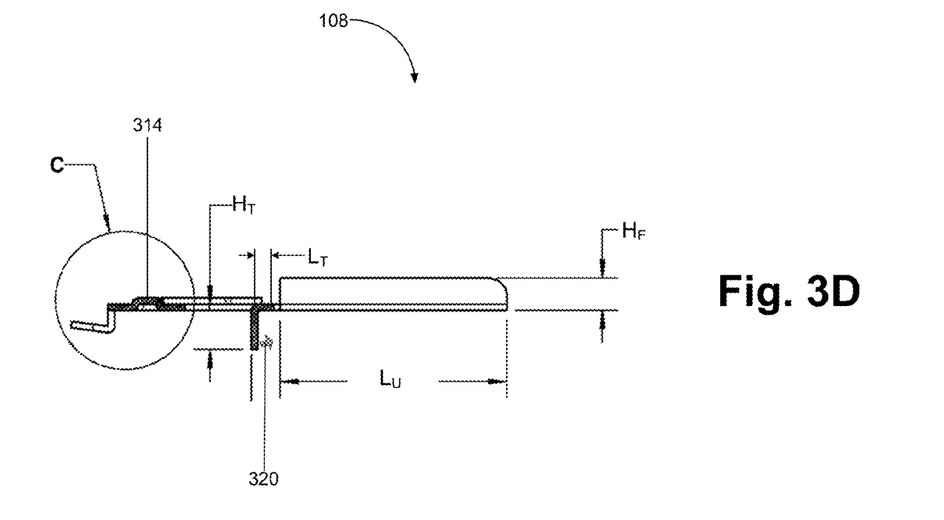

FIGS. 3A and 3B are, respectively, top and bottom perspective views of supporting spacer 108. FIGS. 3C and 3D are, respectively, top and bottom views of supporting spacer 108, with exemplary dimensions. In one implementation, supporting spacer 108 may be constructed from a single piece of shapeable material, such as steel, galvanized steel, aluminum, etc. Dimensions of supporting spacer 108 may vary, depending on its components (e.g., legs 208 and 210), material used, and the type of electrical box to which supporting spacer 108 may be attached, etc. For the purpose of simplicity, it is assumed that supporting spacer 108 is approximately 2.25 inches (in.) long, 1.7 in. wide, and 0.032 in. thick (2.25×1.7× 0.032 in.) and, may be attached to an electrical outlet box of approximately 4×4×2 in.

As shown in FIGS. 3A-3D, supporting spacer 108 may include upper body 202, necks 302, and lower body 204. Upper body 202 may be connected to necks 302, and necks 302 may be connected to lower body 204. The dimensions of upper body 202, necks 302, and lower body 204 are shown in FIGS. 3C and 3D as $W_U \times L_U$, (e.g., 1.44 in.×1.16 in), $W_N \times L_N$ (e.g., 0.91 in ×0.093 in), $W_L \times L_L$ (e.g., 1.72 in ×0.83 in), respectively.

Upper body 202 may include fins 304-1 and 304-2, center body 306, fastening tongue 206, and a tongue connecting portion 308. Fin 304-1 may be created from upper body 202 by folding or bending a left edge of upper body 202 along a line that runs lengthwise (e.g., on a line that runs parallel to a line A in FIG. 3C) within supporting spacer 108.

Fin 304-1 may prop or buttress upper body 202 against forces that are applied to surfaces of body 306, and may prevent upper body 202 from twisting or distorting. In addition, when supporting spacer 108 is attached to electrical outlet box 106 and a top edge of upper body 202 abuts wall 102-2 due to the force along arrow 110, the top edge of fin 304-1 (indicated by an elliptical area 304-3) may aid in stabilizing supporting spacer 108 by providing additional contact surface. Fin 304-2 may be formed similarly and may serve a similar function as fin 304-1. FIG. 3D shows the height of fins 304-1 and 304-2 as $H_F$ (e.g., 0.167 in.).

Center body 306 may include a piece to which other components of upper body 202 are integrally connected. In some implementations, center body 306 may include a groove or an indentation (not shown) that may be formed via punching or molding. Such a feature may provide additional rigidity and strength to upper body 202.

Fastening tongue 206 may include a portion of upper body 202 that extends from tongue connecting portion 308 in a direction that is normal to the surface of center body 306 when supporting spacer 108 is not yet attached to electrical outlet box 106. In some implementations, fastening tongue 206 may be further bent toward center body 306 in the direction of an arrow 320 shown in FIG. 3D, Such a configuration may aid fastening tongue 206 in gripping back panel 212 when upper body 202 is raised perpendicular to lower body 204 as shown in FIG. 2D. The length of fastening tongue 206 is illustrated in FIG. 3D as $H_T$ (e.g., 0.232 in.).

Tongue connecting portion 308 may extend from center body 306 and connect to fastening tongue 206. In one implementation, the length of tongue connecting portion 308 (e.g., $L_T$ in FIG. 3D) may be such that, when upper body 202 is raised with supporting in bar 108 in a position to be attached to electrical outlet box 106 (see FIG. 2D), the surface of fastening tongue 206 may contact the bottom surface of back panel 212 without causing substantial deformation of fastening tongue 206, tongue connecting portion 308, or back panel 212.

Necks 302 may include a portion that connects upper body 202 and lower body 204. Part of necks 302 may be formed by removing slivers of material from the edges of supporting spacer 108, thus establishing recesses 310-1 and 310-2 between upper body 202 and lower body 204. To complete the formation of necks 302, additional material may be cut away from between necks 302. The length of necks 302 (e.g., $W_N - W_O$ in FIG. 3C) may be such that when a force is applied to upper body 202 to raise upper body 202 as shown in FIG. 2C, supporting spacer 108 bends at necks 302. In some implementations, necks 302 may include a score line on either the front or the back of supporting spacer 108. The score line is shown as the dotted portions of line C in FIG. 3C. The score line may render bending upper body 202 perpendicularly relative to back panel 212 easier than it would be without the score line.

Lower body 204 may include belly 312, a molded portion 314, a U-shaped hole 316, and legs 208 and 210. Belly 312 may include a piece to which other components of lower body 204 and necks 302 are integrally connected. Molded portion 314 may run through the surfaces of belly 312 (FIGS. 3A and 3B), and may provide rigidity and/or strength to lower body 204. As shown in FIG. 3A, from the top view, molded portion 314 appears as a protuberance, and as shown in FIG. 3B, from the bottom view, molded portion 314 appears as a groove. Although the shape of molded portion 314 is illustrated as part hexagon, depending on the implementation, molded portion 314 may be implemented in other shapes.

U-shaped hole 316 may be cut in belly 312 to form tongue connecting portion 308 and fastening tongue 206. The cut may extend from one side of tongue connecting portion 308 and traverse around tongue 206, and end at the other side of tongue connection portion 308. In creating the cut, the dimensions of U-shaped hole 316 may be set at $L_O \times W_O$, as shown in FIG. 3C (e.g., 0.438 in ×0.47 in). $L_O$ and $W_O$ should be large enough to accommodate the creation of fastening tongue 206 and tongue connection portion 308, which is shown as $W_T$ wide (e.g., 0.22 in). U-shaped hole 316 and recesses 310-1 and 310 may reduce the strength of necks 302, such that when a force is applied to upper body 202 of supporting spacer 108 in the direction of arrow 220, supporting spacer 108 may bend at neck 302 as illustrated in FIGS. 2C and 2D.

Figure 3E:
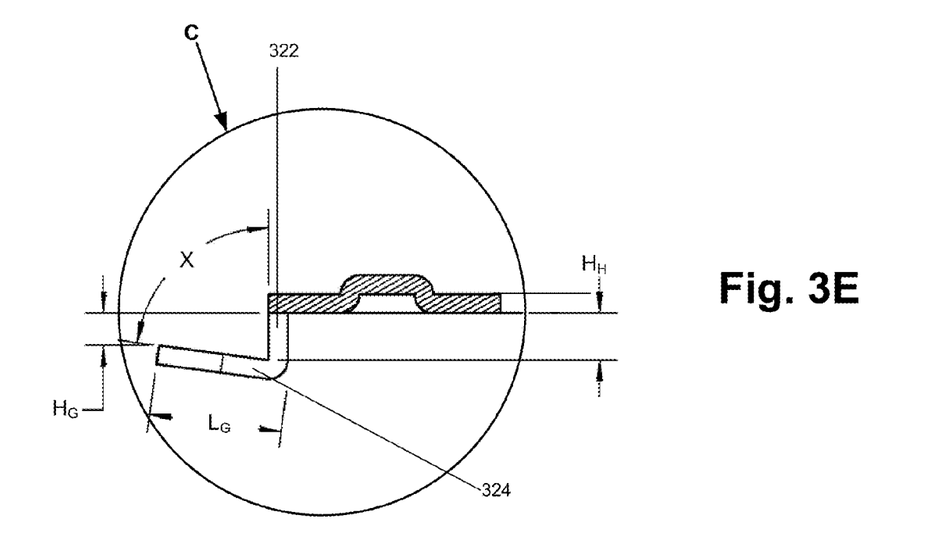
FIG. 3E is an expanded side view of legs of the supporting spacer shown in FIG. 3D.

Each of legs 208 and 210 may extend lengthwise relative to supporting spacer 108, from lower body 204's edge that is parallel to the widthwise direction of supporting spacer 108. FIG. 3E is an expanded side view of leg 208/210 in FIG. 3D. As shown in FIG. 3E, leg 208/210 may include a thigh 322 and lower leg 324.

Thigh 322 may be attached, on one end, to lower body 204 in a direction perpendicular to the plane of supporting spacer 108 and in the same direction as fastening tongue 206. On the other end, thigh 322 may be attached perpendicularly to lower leg 324. In FIG. 3E, the length of thigh 322 is shown as $H_H$, which, in one implementation, may be set at about 0.08 in., and may correspond approximately to the thickness of back panel 212.

Lower leg 324 may be attached substantially perpendicular to thigh 322, in the direction away from the center of and substantially in the plane of supporting spacer 108. In FIG. 3E, the angle between thigh 322 and lower leg 324, shown as X, may be slightly less than 90°, such that a gap $H_G$ between the bottom surface of supporting spacer 108 and the end of lower leg 324 is less than the length of thigh 322, $H_H$, and, therefore, is also less than the thickness of back panel 212. Consequently, when supporting spacer 108 is in the position illustrated in FIG. 2D, the distal end of lower leg 324 may exert a gripping force against the bottom surface of back panel 212 and aid in attaching supporting spacer 108 to electrical outlet box 106. The magnitude of the resulting, gripping force may depend on angle X, as well as the length of lower leg 324, shown as $L_G$ (e.g., 0.225 in) in FIG. 3E.

Figure 4:
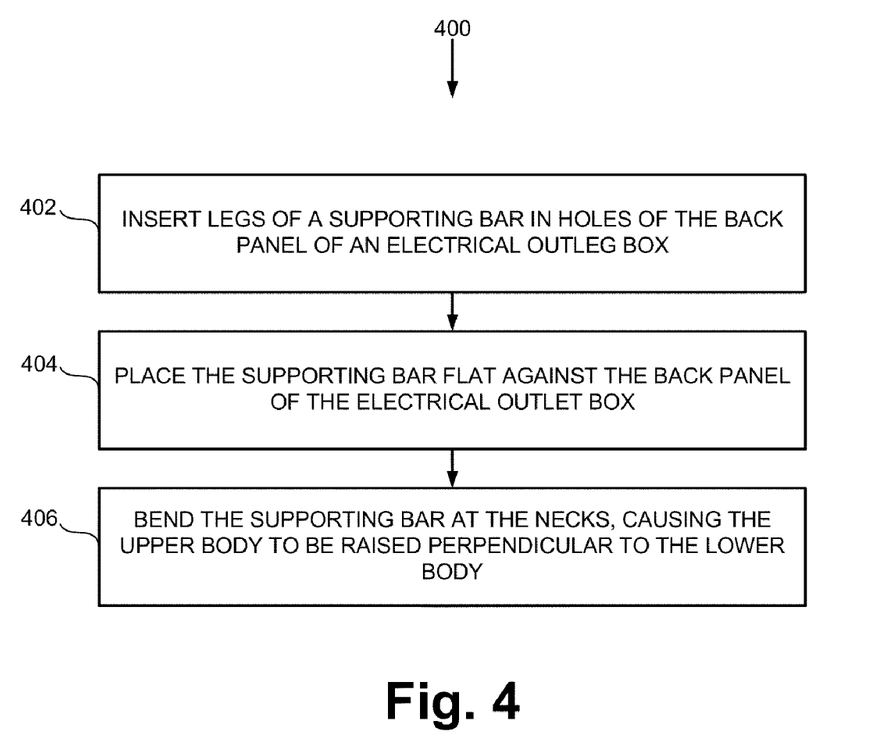
FIG. 4 is a flow diagram of an exemplary process for attaching the supporting spacer of FIG. 1 to the electrical outlet box of FIG. 1.

FIG. 4 is a flow diagram of an exemplary process 400 for attaching supporting spacer 108 to electrical outlet box 106. Assume that electrical outlet box 106 has yet to be mounted on a wall stud. Process 400 may begin when legs 208 and 210 of supporting spacer 108 are inserted into fastening holes 214-2 and 214-3 at back panel 212 of an electrical outlet box 106 (block 402). To insert legs 208 and 210 into the fastening holes 214-2 and 214-3, a user may hold supporting spacer 108 in a direction relatively and substantially normal to the surface of back panel 212 and slide legs 208 and 210 into fastening holes 214-2 and 214-3, respectively, as shown in FIG. 2B.

Supporting spacer 108 may be placed flat against back panel 212 of electrical outlet box 106 (block 404). In placing supporting spacer 108 flat against back panel 212, while legs 208 and 210 are engaged in fastening holes 214-2 and 214-3, supporting spacer 108 may be rotated about lower body 204's edge that touches back panel 212, bringing fastening tongue 206 toward fastening hole 214-1 in back panel 212. The rotation may stop when supporting spacer 108 is flat against the top surface of back panel 212, and fastening tongue 206 protrudes beneath the bottom surface of back panel 212 (not shown).

Supporting spacer 108 may be bent at necks 302, causing upper body 202 of supporting spacer 108 to be raised perpendicular to lower body 204 (block 406). To bend supporting spacer 108 that is placed flat against the top surface of back panel 212, a force may be applied to lower body 204 to hold lower body 204 in place. As illustrated in FIG. 2D, when another force is applied to upper body 202 in the direction of arrow 220 (e.g., by pushing upper body 202 at the edge that extends beyond the edge of electrical outlet box 106), supporting spacer 108 may bend about necks 302. The user may stop bending supporting spacer 108 when upper body 202 is perpendicular to lower body 204.

Figure 5:
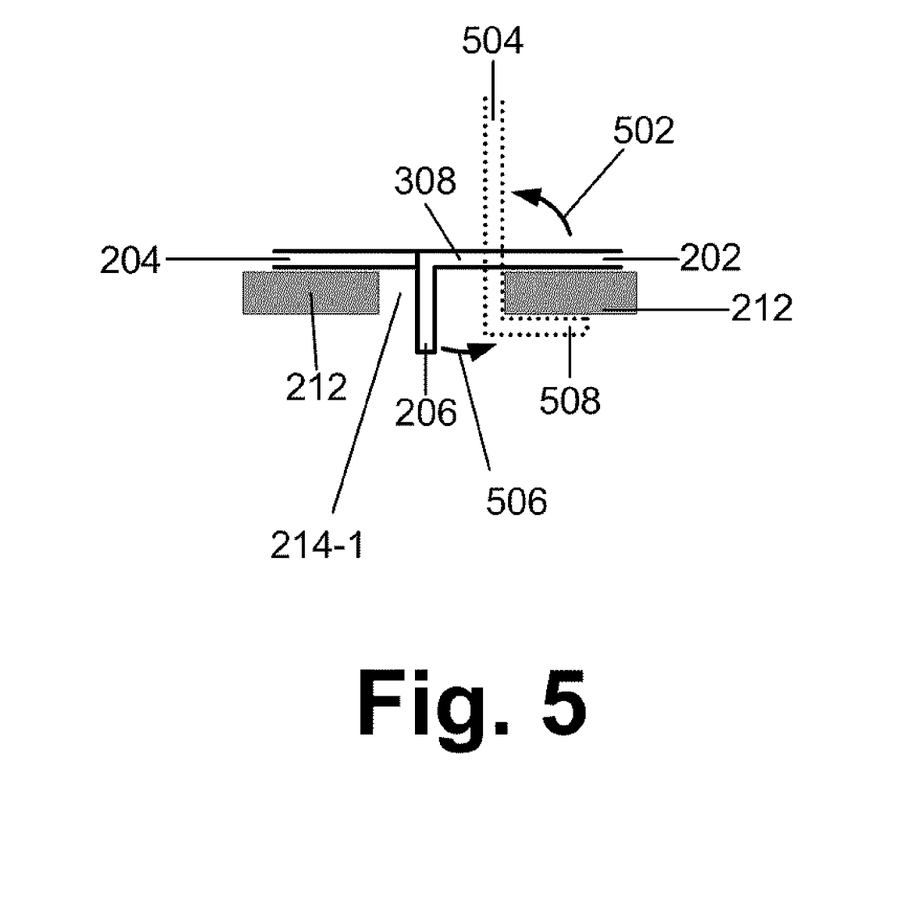
FIG. 5 illustrates configurations of the supporting spacer of FIG. 1 in relation to a bottom plate of the electrical outlet box of FIG. 1, before and after the supporting spacer is attached to the electrical outlet box.

FIG. 5 illustrates configurations of supporting spacer 108 in relation to bottom plate 212 of electrical outlet box 106 before and after supporting spacer 108 is attached to electrical outlet box 106. As shown, upper body 202 and lower body 204 are placed flat against bottom plate 212 (see block 402). In this configuration, fastening tongue 206 extends from tongue connecting portion 308 into a fastening hole 214-1.

When upper body 202 is raised in the direction of arrow 502 and placed in a position 504 shown in dotted lines, fastening tongue 206 and tongue connecting portion 308 may move in the direction of arrow 506. Fastening tongue 206 and tongue connecting portion 308 may end in a position 508 shown in dotted lines.

In some implementations, because supporting spacer 108 is designed to be attached to electrical boxes with hands, edges of supporting spacer 108 may be rounded or smoothed to prevent supporting spacer 108 from accidentally cutting the hands. For example, the top corner edges of fins 304-1 and 304-2, fastening tongue 206, and legs 208 and 210 are illustrated in FIGS. 3A-3D as being round.

Figure 6:
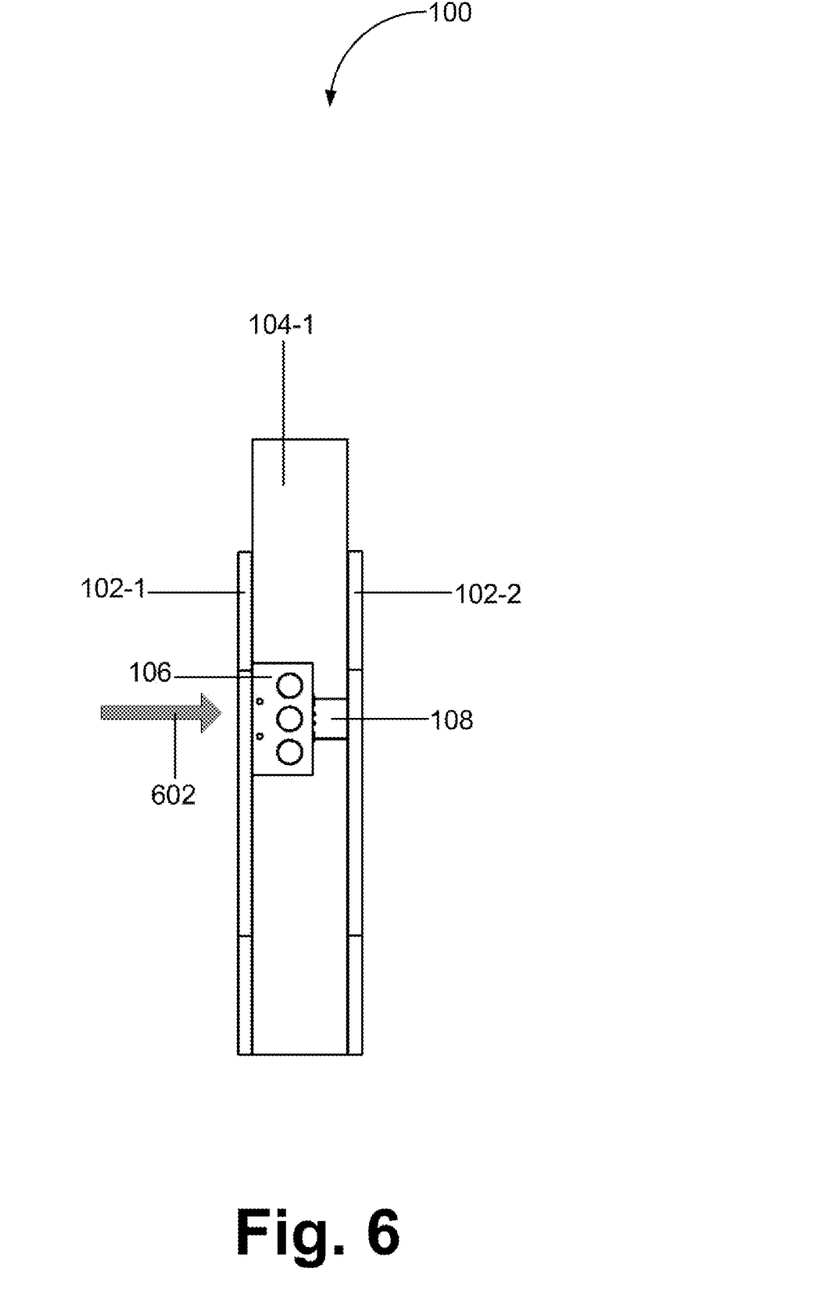
FIG. 6 illustrates a result of attaching the supporting spacer to the electrical outlet box of FIG. 1 and mounting the electrical outlet box to a wall stud.

FIG. 6 illustrates a result of attaching supporting spacer 108 to electrical outlet box 106 and mounting electrical outlet box 106 to wall stud 104-1 (FIG. 1). FIG. 6 is a side view of wall electrical assembly 100.

As shown in FIG. 6, wall stud 104-1 is located between drywall elements 102-1 and 102-2. Further, the front edge of electrical outlet box 106, which is mounted on wall stud 104-1, is flush with the front edge of wall stud 104-1. Supporting spacer 108, which is attached to electrical outlet box 106 in accordance with process 400 and without use of any tools, is positioned and mounted between electrical outlet box 106 and drywall element 102-2. Supporting spacer 108 may prevent the space between the electrical outlet box and a wall from collapsing when a force is applied to electrical utility box 106 in the direction of arrow 602.

The foregoing description of implementations provides illustration, but is not intended to be exhaustive or to limit the implementations to the precise form disclosed. Modifications and variations are possible in light of the above teachings or may be acquired from practice of the teachings. For example, dimensions of the devices are provided for ease of understanding, but different implementations of supporting spacer 108 for different boxes may have different dimensions. Further, supporting spacer may be used not only for electrical boxes, but for other types of boxes that may be mounted on a wall.

In addition, while series of blocks have been described with regard to exemplary processes illustrated in FIG. 4, the order of the blocks may be modified in other implementations. In addition, non-dependent blocks may represent acts that can be performed in parallel to other blocks.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. An integrally formed spacer, comprising:
    an upper body having a flat surface, including:
        a fastening tongue perpendicular to the flat surface and dimensioned to fit into a first fastening hole in a bottom wall of an electrical box;
    a lower body, including:
        a first leg having a notch to receive the bottom wall of the electrical box via a second fastening hole in the bottom wall of the electrical box; and
    a neck portion having two ends in a lengthwise direction of the integrally formed spacer, one end of the neck portion connected to the upper body and another end connected to the lower body,
    wherein when the first leg is in the second fastening hole and the lower body is held flat against an outside surface of the bottom wall of the electrical box, the fastening tongue is in the first fastening hole and bending the integrally formed spacer to set the upper body perpendicular to the lower body fastens the integrally formed spacer to the bottom wall of the electrical box.

2. The integrally formed spacer of claim 1, wherein the upper body further includes:
    a fin formed along an edge of the upper body, the edge running in the lengthwise direction.

3. The integrally formed spacer of claim 1, wherein the lower body further includes:
    a molding to strengthen the lower body.

4. The integrally formed spacer of claim 1, wherein the first leg includes:
    a thigh connected perpendicularly to a bottom surface of the lower body, the bottom surface being in a same plane as the flat surface of the upper body; and
    a lower leg connected substantially perpendicular to the thigh, the lower leg being substantially parallel to the bottom surface of the lower body and extending away from the neck portion.

5. The integrally formed spacer of claim 4, wherein a length of the thigh is approximately equal to a thickness of the bottom wall of the electrical box.

6. The integrally formed spacer of claim 5, wherein an angle at which the lower leg connects to the thigh is such that a distal end of the lower leg is closer to the bottom surface of the lower body than another end of the lower leg.

7. The integrally formed spacer of claim 1, wherein the lower body includes a second leg having a notch to receive the bottom wall of the electrical box via a third fastening hole in the bottom wall of the electrical box.

8. The integrally formed spacer of claim 1, further comprising:
    a hole that covers part of the neck portion and the lower body, the hole being U-shaped around the fastening tongue, and
    a cut that extends from a side edge of the integrally formed spacer to the neck portion,
    wherein dimensions of the hole and the cut partly determine strength of the neck portion.

9. The integrally formed spacer of claim 8, wherein the dimensions of the hole and the cut are set to enable the integrally formed spacer to bend at the neck portion when a sufficient force is applied to the upper body while the lower body is held flat against the outside surface of the bottom wall of the electrical box, causing the upper body to be perpendicular to the lower body.

10. The integrally formed spacer of claim 9, wherein the upper body further includes:
a tongue connecting portion that rigidly interconnects the fastening tongue to the upper body and moves the fastening tongue to hug an inside surface of the bottom wall of the electrical box when the upper body is perpendicular to the lower body due to the sufficient force.

11. The integrally formed spacer of claim 1, wherein the integrally formed spacer comprises at least one of:
steel, galvanized steel, or aluminum.

12. The integrally formed spacer of claim 1, wherein the upper body includes smooth corners at a distal edge away from the neck portion.

13. A method comprising:
inserting two legs of a supporting spacer, having an upper body and a lower body, into corresponding first and second holes on a top wall of an electrical box;
while the two legs of the supporting spacer are inserted into the corresponding first and second holes, inserting a fastening tongue of the upper body of the supporting spacer into a third hole in the top wall;
placing the supporting spacer flat against an outside surface of the top wall; and
bending the supporting spacer to cause the fastening tongue to hug the top wall and affix the supporting spacer to the top wall.

14. The method of claim 13, wherein the bending the supporting spacer includes:
holding the lower body of the supporting spacer against the outside surface of the top wall;
applying a force on the upper body to bend the supporting spacer; and
bending the supporting spacer until the upper body is perpendicular to the lower body and the fastening tongue holds the top wall.

15. The method of claim 14, further comprising:
installing the electrical box to a wall stud.

16. A device comprising:
an upper body including a fastening tongue;
a lower body having two legs at an edge away from the upper body, the lower body being connected to the upper body; and
a neck portion between the upper body and the lower body,
wherein when the two legs and the fastening tongue are in holes in one of top and bottom walls of a box, the lower body is placed flat against an outside surface of the one of the top and bottom walls of the box and raising the upper body to be perpendicular to the lower body attaches the device to the one of the top and bottom walls of the box.

17. The device of claim 16, wherein the neck portion provides for the device to bend in an L-shape when a force is applied to the upper body while the lower body is held flat against the outside surface of the one of the top and bottom walls of the box.

18. The device of claim 17, wherein the upper body further includes a tongue connecting portion to which the fastening tongue is attached, the tongue connecting portion moving the fastening tongue to hold the one of the top and bottom walls of the box when the device is bending to form the L-shape.

* * * * *